(12) United States Patent
Schuepbach et al.

(10) Patent No.: US 9,017,056 B2
(45) Date of Patent: Apr. 28, 2015

(54) LAMP SYSTEM FOR CURING RESIN IN LAMINATED SAFETY GLASS

(71) Applicant: GlasWeld Systems, Inc., Bend, OR (US)

(72) Inventors: Seth R. Schuepbach, Bend, OR (US); Dennis Garbutt, Bend, OR (US); Randy L. Mackey, Bend, OR (US)

(73) Assignee: GlasWeld Systems, Inc., Bend, OR (US)

( * ) Notice: Subject to any disclaimer, the term of this patent is extended or adjusted under 35 U.S.C. 154(b) by 80 days.

(21) Appl. No.: 14/011,323

(22) Filed: Aug. 27, 2013

(65) Prior Publication Data

US 2014/0065254 A1   Mar. 6, 2014

Related U.S. Application Data

(60) Provisional application No. 61/743,355, filed on Aug. 30, 2012.

(51) Int. Cl.
    *B29C 35/08* (2006.01)
    *B29C 73/02* (2006.01)

(52) U.S. Cl.
    CPC ........... *B29C 35/0805* (2013.01); *B29C 73/025* (2013.01); *B29C 2035/0827* (2013.01)

(58) Field of Classification Search
    CPC ................... B29C 2035/0827; B29C 73/025; B29C 35/0805
    USPC .......................................... 425/12, 13, 174.4
    See application file for complete search history.

(56) References Cited

U.S. PATENT DOCUMENTS

| 6,898,372 | B2 | 5/2005 | Boyle |
| 8,378,315 | B2 | 2/2013 | Wanstrath |
| 2004/0202458 | A1* | 10/2004 | Boyle et al. .................... 392/427 |
| 2010/0012857 | A1* | 1/2010 | Wanstrath et al. .......... 250/492.1 |
| 2011/0217482 | A1* | 9/2011 | Thomas et al. ................ 427/558 |

* cited by examiner

*Primary Examiner* — James Sanders
*Assistant Examiner* — Joseph Leyson
(74) *Attorney, Agent, or Firm* — Schwabe, Williamson & Wyatt

(57) ABSTRACT

An apparatus for uniformly curing resin is described herein. The apparatus includes at least a lamp system that is to emit ultraviolet ("UV") light. The lamp system is to emit the UV light from a light-emitting diode ("LED") light source, which is to be energized and controlled by an electrical circuit. The electrical circuit may be provided as part of a circuit board which has power delivered thereto from a power cord. The lamp system can further include a handle having an attachment device so that the lamp system may be securely engaged with a glass surface. The lamp system may be adapted to be coupled with a resin injection system. When engaged with the resin injection system, the lamp system can deliver UV light to the injected resin so that the injected resin may be quickly and uniformly cured.

26 Claims, 3 Drawing Sheets

LAMP SYSTEM FOR CURING RESIN IN LAMINATED SAFETY GLASS

CROSS REFERENCE TO RELATED APPLICATIONS

The present application claims priority to U.S. Provisional Patent Application No. 61/743,355, filed Aug. 30, 2012, entitled "Lamp System for Curing Resin in Laminated Safety Glass," the entire disclosure of which is hereby incorporated by reference in its entirety.

FIELD

The present disclosure relates to a lamp system for curing resin in glass. More particularly, the present disclosure relates to a lamp system that facilitates uniform curing of the resin in the glass.

BACKGROUND

It is common for glass to experience damage from objects impacting the surface of the glass, thereby causing not only surface damage but also subsurface damage. For example, a relatively small object, such as a stone or cinder, hitting a glass windshield can result in a small surface damage with most of the damage being subsurface. Colloquially, such damage is commonly referred to as a rock chip, a bull's eye or a star break. If untreated, such breaks and other breaks can result in a crack propagating through the glass and eventually the entire glass windshield may need to be replaced. However, if the break is timely treated there is a good possibility that the break may not result in propagating a crack, thus saving the windshield. In some instances, the majority of the damage from a break may manifest below the surface of the glass windshield and, consequently, repairing the break may be difficult.

Commonly, treating a break in glass may involve delivering a type of resin in liquid form into the break and allowing the resin to cure (i.e., harden). The resin may cure into a hardened structure within the break, thereby securing and sealing the break to prevent further damage to the glass. Various methods may be utilized to deliver the resin into the break.

For example, one method for treating a break in a glass involves placing a resin injection system onto the surface of the glass, where the resin injection system may be held in place on the glass by suction cups on the resin injection system. Once the resin injection system is in place, the resin injection system facilitates injection of the resin in liquid form into the break. Injection of the resin may be achieved by creating a vacuum in the break and subsequently injecting the resin into the resulting void in the break.

Once the resin is injected into the break thus filling the break, the resin may be cured to form a hardened structure within the break. Often times, curing the resin may involve exposing the resin to various types of lights such as ultraviolet ("UV") light. A common method of exposing the resin to UV light involves a technician holding a lamp having a UV bulb and exposing the resin to the lamp. Exposing the resin to the UV lamp may involve periodically moving the lamp around the injection system. Often the resin injection system may be in place during the curing process to facilitate maximum filling of the break because the resin may reduce in volume as it cures. Removing the resin injection system prior to the curing process may result in voids in the break, thereby reducing the structural integrity of the glass. However, having the resin injection in place has some advantages.

For example, having the resin injection system in place during the curing process prevents substantially all of the resin being exposed to the lamp at one time. That is, as previously described, the lamp used to cure the resin is periodically moved around the injection system thereby exposing all portions of the resin to the lamp. Because all portions of the resin may not be exposed to the UV light at the same time the resin may not cure uniformly (i.e., some portions of the resin may receive more concentrated light than other portions of the resin for varying durations of time allowing potions of the resin to cure at different rates). Non-uniform curing of the resin may affect the overall structural integrity of the hardened resin in the break.

In the example of a glass windshield on a vehicle, even providing electrical power to the lamp for curing the resin may pose some difficulties. For example, lamps utilized to cure the resin may require specific types of electrical power, such as specific voltage. A common source of electrical power for a lamp is a battery included in the vehicle. In one implementation, a vehicle battery produces twelve volts direct current ("DC"), whereas another implementation may feature a battery (or multiple batteries) that produces twenty-four volts DC. Because these common sources of electrical power differ, a lamp configured to receive electrical power from the battery producing twelve volts DC may not receive electrical power from a battery (or multiple batteries) producing twenty-four volts DC.

It is also common for UV lamps used to cure resin in breaks to utilize fluorescent glass bulbs to produce the correct frequency of UV light to cure the resin in breaks. These glass bulbs are very fragile and may break in normal usage or when the technician needs to change the bulb during normal maintenance. This can be a problem due the cost of the replacement bulbs, the danger of harm from the sharp shards of broken glass, and the possible release of mercury from the broken fluorescent glass bulb.

BRIEF DESCRIPTION OF THE DRAWINGS

The embodiments herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION

Figure 1:
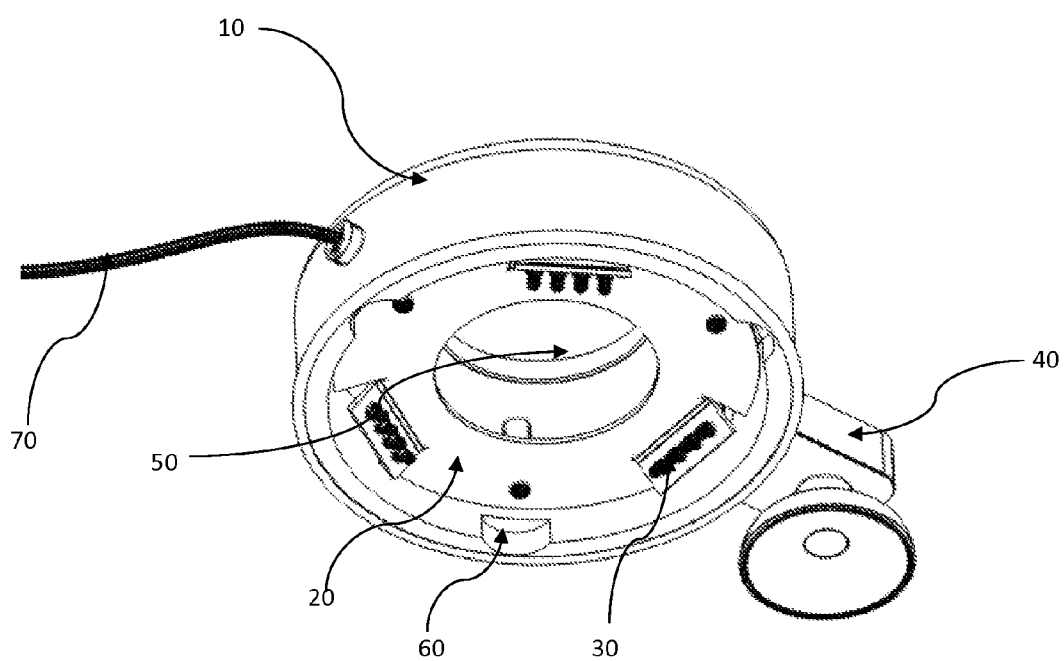
FIG. 1 is a perspective view of a lamp for uniformly curing resin in glass, according to one embodiment.

Several embodiments with reference to the appended drawings are now explained. The following description and drawings are illustrative and are not to be construed as limiting. Numerous specific details are described to provide a thorough understanding of various embodiments. However, in certain instances, well-known or conventional details are not described in order to provide a concise discussion of embodiments of the present disclosure.

Reference in the Specification to "one embodiment" or "an embodiment" means that a particular feature, structure, or characteristic described in conjunction with the embodiment can be included in at least one embodiment. The appearances of the phrase "in one embodiment" in various places in the Specification do not necessarily all refer to the same embodiment.

Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

The present embodiments are described as they may be associated with, by way of example, a glass windshield on a vehicle. However, it should be appreciated by those of ordinary skill in the relevant art that the present embodiments may be practiced with any type of glass (e.g., laminated safety glass) that may be treated with resin. Additionally, the present embodiments are described as they may be utilized to facilitate treatment of glass having a combination of surface and subsurface damage. However, it should be appreciated by those of ordinary skill in the relevant art that the present embodiments may be utilized to facilitate treatment of a wide variety of damage that may be treated with resin, such as chips, bulls-eyes, star breaks, and other damage treatable with resin, inclusively referred to herein as a "break."

FIG. 1 illustrates a perspective view of an embodiment of a lamp system 1 for uniformly curing resin. The open annular face, which allows light emitted from the light-emitting diode ("LED") light source 30 to propagate beyond the boundaries of the housing 10, may be considered the bottom face and it is configured to face a glass surface (not shown) to which the lamp system 1 may be affixed. The perspective of FIG. 1 may therefore be regarded as a bottom perspective, although the use of "bottom" is not to be construed as defining any features of the lamp system 1.

The lamp system 1 includes a housing 10 (having the illustrated open bottom face) to accommodate therein a LED light source 30 for uniformly curing resin. In the illustrated embodiment, the housing 10 is substantially annular in shape. However, other shapes for the housing 10 are possible and may function as satisfactorily as the illustrated annular shape. The housing 10 is substantially rigid and durable so that it will maintain its form even where the LED light source 30 generates substantial heat for extended durations. In one embodiment, the material comprising the housing 10 may dissipate heat generated by the LED light source 30. The housing 10 can be composed of aluminum, glass, polycarbonate, stainless steel, or any other substantially rigid material that is suitable for use as part of a lamp system, including composite materials.

Complementary to the bottom face, a substantially closed top face defines another face of the housing 10. This closed top face may be of or may be lined with a material to reflect light emitted from the LED light source 30 so that the emitted light is directed toward a glass surface. Alternatively, the top face may be reflective due to the characteristics of the material comprising the housing 10. In another embodiment, the top face of the housing 10 is not reflective or is negligibly reflective.

In some embodiments, the housing 10 includes an opening or hole 50 that is suitable to accommodate a resin injection system (not shown). The bottom face of the housing 10 may be substantially unobstructed to allow emitted light to reach the glass surface and, therefore, the opening 50 is manifest in the otherwise closed top face of the housing 10. The opening 50 may be specific to the dimensions of one or more resin injection system(s) so that a resin injection system can be securely coupled with the housing 10 by its insertion through the opening 50. In one embodiment, the opening 50 has a diameter that is slightly larger than a diameter of the resin injection system (e.g., on a centimeter or millimeter order of magnitude).

Also to accommodate the resin injection system, the housing 10 may include one or more coupling components 60 adapted to engage with the resin injection system. In the embodiment shown in FIG. 1, the coupling components 60 are illustrated as a plurality of notches that are disposed about the inner surface of the side face of the housing 10. The coupling components 60 may be adapted to receive protrusions or another complementary component of the resin injection system so that the resin injection system can be securely coupled with the housing 10. Thus, the lamp system 1 can be coupled with the resin injection system during the time that the resin injection system is to deliver resin into a glass surface. The coupling components 60 may be differently implemented in other embodiments, such as by protrusions from the inner surface of the side of the housing 10.

To cure resin the lamp system 1 includes a LED light source 30. The LED light source 30 may be one or more LED array(s) that is annularly arranged within the housing 10 to facilitate uniform curing of resin by delivering light to the resin from a plurality of angles. In the interest of space, cost, and/or other considerations, the LED light source 30 may be comprised of a plurality of noncontiguous LED arrays (as illustrated) without appreciably sacrificing a substantially uniform or even delivery of light to the resin to be cured. These noncontiguous LED arrays can have small or single rows and/or columns. As shown in FIG. 1, each noncontiguous LED array of the LED light source 30 may be arranged in a portion of the circuit board 20 at an angle relative to a main portion of the circuit board 20 to outwardly emit the UV light from the housing toward a location at which the resin injection system is to inject resin so as to cure the injected resin.

Preferably, the LED light source 30 is to emit ultraviolet ("UV") light (i.e., radiation). However, the LED light source 30 may be adapted to emit UV light in one or more specific bands that is suitable for curing resin. In one embodiment, the LED light source 30 is adapted to emit UV light having a wavelength between 300 to 400 nanometers, inclusive. Similarly, the LED light source may be adapted to emit UV light at a radiant output power that is suitable for curing resin. For example, the LED light source may deliver UV light at a radiant output power of 500 to 10,000 milliwatts of output power per square centimeter, inclusive.

The wavelength and power level of the UV light to be emitted by the LED light source 30 may be contingent upon one or more characteristics of the resin to be cured. In one embodiment, the LED light source is to emit UV light at a constant or predetermined wavelength and/or power level. The wavelength and/or power level may be characteristics of the LED light source 30 and/or may be configurable by a user, such as through a dial or switch (not shown).

The LED light source 30 is coupled with an electrical circuit that is to energize the LED light source 30 so that UV light is emitted. In the illustrated embodiment, the electrical circuit is provided through a circuit board 20. The circuit board 20 can be, for example, a printed circuit board or flexible circuit. While the illustrated embodiment shows a circuit board 20, any suitable LED holding device may be implemented in place of the circuit board 20 (depending upon the embodiment).

As power is delivered to the circuit board 20, the electrical circuit is adapted to supply power to the LED light source 30 at a predetermined voltage and/or current. Accordingly, characteristics of the UV light, such as duration and/or radiant power level, can be controlled through the LED light source 30. The characteristics of the UV light, as prescribed by the controlled LED light source 30, may be predetermined or constant.

In some embodiments, the circuit board 20 includes one or more components adapted to regulate the voltage and/or current that is applied to the LED light source 30. In one embodiment, the circuit board 20 includes circuitry adapted to deliver a fixed output current to the LED light source 30 by varying the output voltage as required to maintain a predetermined or constant current. In another embodiment, the circuit board 20 includes circuitry adapted to regulate the voltage so it may be maintained at a predetermined or constant level. While the embodiment illustrated in FIG. 1 shows the regulation circuitry as included in the circuit board 20, one of ordinary skill in the art will understand that such regulation circuitry can be included in different locations in the lamp system 1, e.g., the regulation circuitry may be included in the power cord 70 or may be coupled with the circuit board 20 and adapted to receive the power cord 70. In another embodiment, a current regulator can be included in the circuitry of the circuit board 20 while a voltage regulator can be included in the circuitry of the power cord 70.

The lamp system 1 may be utilized to repair the glass windshield of a vehicle, and one or more batteries in the vehicle may supply the power required to drive the LED power source 30. Because the one or more batteries in different vehicles may supply power at nonuniform levels, such as twelve (12) to twenty-four (24) volts, the included regulation circuitry may be adapted to maintain a suitable voltage and/or current for proper operation of the LED light source 30. The included regulation circuitry may be adapted to supply a wide range of voltages, such as from ten (10) to thirty-six (36) volts of direct current ("DC"). The included regulation circuitry may supply voltage to the LED light source 30 at a predetermined or constant level. However, in one embodiment, the voltage can be modified, such as through a user-operated switch or dial (not shown).

Coupled with the circuit board 20 and supplying power thereto is a power cord 70. The power cord 70 is adapted to provide power from a power supply to the circuit board 20 for energizing and controlling the LED light source 30. The power cord 70 may be adapted to derive power from one or more batteries in a vehicle and, therefore, may include a traditional car outlet connector, such as a plug for connecting with a car cigarette lighter outlet. Alternatively, the power cord 70 may include a plug for a standard wall outlet. As described above, the power cord 70 may include circuitry for regulating voltage and/or current. For example, the power cord 70 may be adapted to receive power at a first voltage DC and convert it to a second voltage DC. Additionally, the power cord 70 may be adapted to engage with an alternating current ("AC") plug, and so may include circuitry for AC to DC conversion. In one embodiment, power is supplied to the circuit board 20 via a rechargeable battery pack (not shown), such as a Lithium Ion battery.

The lamp system 1 may be attached to a glass surface for operation without user assistance by means of a handle 40 having a suction cup or other attachment device. The suction cup may be located at the distal end of the handle 40 (as illustrated), although other configurations are possible without substantially departing from the scope herein. Preferably, the suction cup has a holding force at least sufficient to maintain the lamp system 1 in a fixed position when the suction cup is engaged with a glass surface that is horizontal (i.e., parallel to the horizon plane). In some embodiments, the suction cup has a holding force sufficient to fixedly attach the lamp system 1 to a glass surface that is vertical (i.e., perpendicular to the horizon plane).

Figure 2:
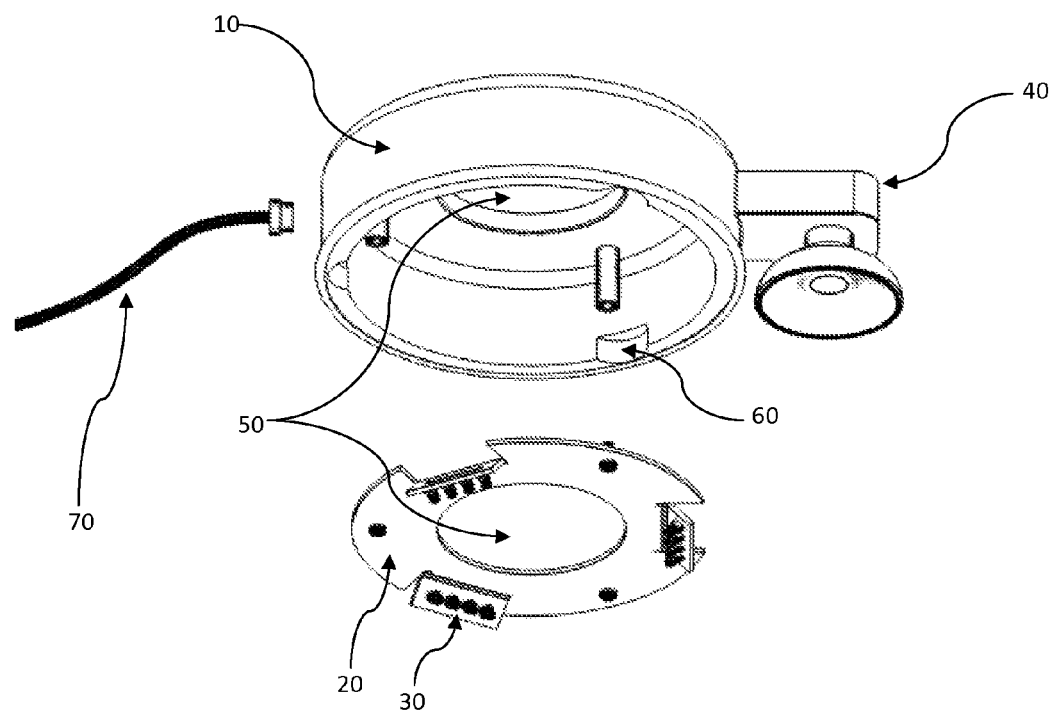
FIG. 2 is an exploded view of a lamp for uniformly curing resin in glass, according to one embodiment.

Turning to FIG. 2, an exploded, bottom perspective view of the lamp system 1 is shown. This exploded perspective illustrates an arrangement of the components of the lamp system 1. In this embodiment, the circuit board 20 is coupled with the LED light source 30, and further coupled with the top face of the housing 10. Thus, the LED light source 30 can be mounted in the housing 10 via the circuit board 20. To realize the annular arrangement of the LED light source 30, the circuit board 20 may be similarly annularly arranged in the housing 10.

FIG. 2 illustrates a substantially annularly shaped circuit board 20 that is consistent with the substantially annularly shaped housing 10, so that the circuit board 20 can be approximately concentrically arranged within the housing 10. The LED light source 30 is likewise substantially annularly arranged on the circuit board 20 and therefore within the housing 10. In one embodiment, the annular shape of the circuit board 20 necessitates an opening 50 that is suitable to accommodate a resin injection system (not shown), consistent with the opening 50 in the housing 10. The opening 50 formed by the housing 10 and the circuit board 20 may have different dimensions at circuit board 20 than at the housing 10. For example, the opening 50 may have a wider diameter at the circuit board 20 than at the housing 10.

In the illustrated embodiment, the power cord 70 is coupled with the circuit board 20 at or near a side face of the housing 10. However, other arrangements are suitable for achieving substantially the same result. In one embodiment, the power cord 70 is detachably connected with the circuit board 20. For example, the power cord 70 and the circuit board 20 may include respective male-to-female connectors so that power may be delivered through the power cord 70 to the circuit board 20 when the male-to-female connectors are engaged. In another embodiment, the power cord 70 is fixedly connected with the circuit board 20 (e.g., circuitry of the power cord 70 is soldered to circuitry of the circuit board 20).

Figure 3:
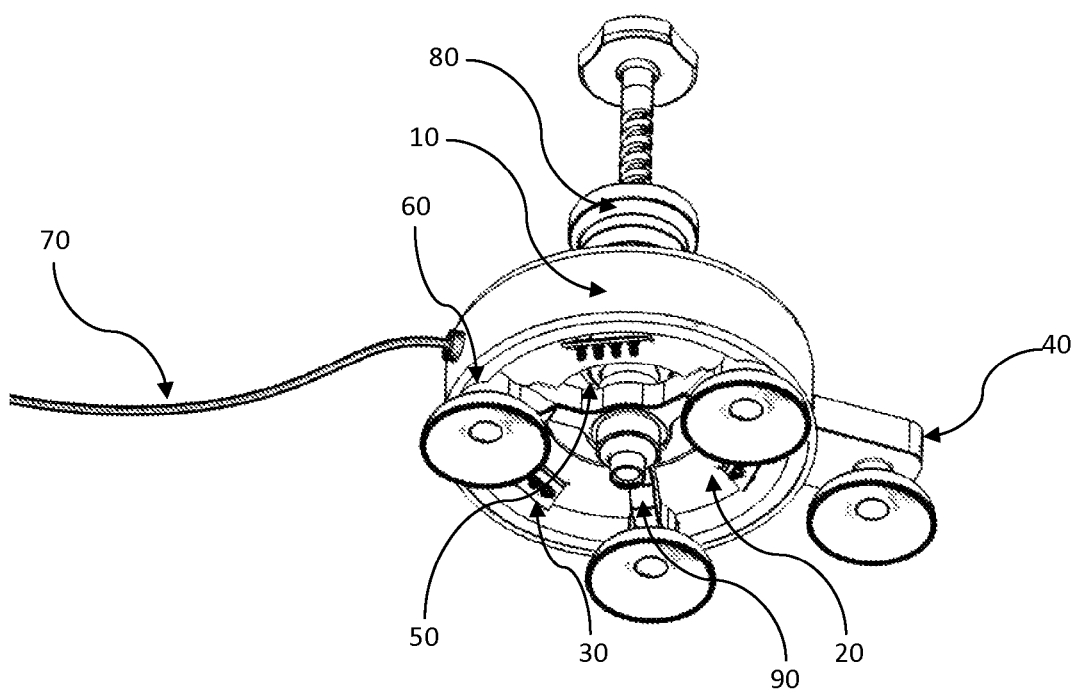
FIG. 3 is a perspective view of a lamp for uniformly curing resin in glass that is coupled with a resin injection system, according to one embodiment.

Now with reference to FIG. 3, a system 2 for curing resin is shown. The system 2 includes at least two subsystems: (1) a lamp system 1 and (2) a resin injection system 80. The lamp system 1 may include any of the preceding embodiments, as described with reference to FIGS. 1 and 2. To uniformly cure resin, the lamp system 1 can be integrated with the resin injection system 80 even while the resin injection system 80 is in place over a break during the curing process. The resin injection system 80 may be adapted to continually provide resin into a break to compensate for volumetric changes of the resin as the resin is cured by the lamp system 1. The resin injection system 80 may be of a vacuum-type resin injection system, such as, but not limited to, a Pro-Vac 2000 resin injection system of Glas-Weld Systems, Inc., of Bend, Oreg. Accordingly, an example of a size for the opening 50 may be approximately 1.875 inches (4.762 cm) in diameter.

In some embodiments, the resin injection system includes an integrated support structure 90. The support structure 90 of the resin injection system 80 may be utilized to mount the resin injection system 80 to a glass surface. According to one embodiment, the support structure 90 has support legs that are laterally projected, the outer extreme of which define an annular shape. The support structure 90, and in particular the support legs, facilitate support of the resin injection system 80 relative to a break in a glass surface (e.g., at a position substantially over the break). To securely affix the resin injection system to the glass surface, the support legs of the support structure 90 can include respective suction cups at respective distal ends of the support legs. In alternative embodiments, other attachment devices can be used in place of the suction cups to fixedly attach the resin injection system 80 to the glass surface.

In one embodiment, the support structure 90 of the resin injection system 80 and the interlocking engagement of the lamp system 1 thereto outmodes the handle 40 of the lamp system 1. Thus, the handle 40 may only be useful where the resin injection system 80 is not present, such as where the resin injection system 80 has been removed from the break on the glass surface for the purpose of applying pit filler to the break after the break has been completely filled with resin and the initial resin curing with the resin injection system 80 in place on the glass has occurred. Accordingly, some embodiments of the system 2 may feature a handle 40 that is detachable from the lamp system 1. Such a handle 40 may be threadably connected with a side face of the housing 10 and may be removed for space or other considerations.

In an illustrative operational embodiment, the resin injection system 80 may be placed on a glass surface having a break. In particular, the support structure 90 of the resin injection system 80 is attached onto the glass via suction cups. Once the resin injection system 80 fills the break with liquid resin, the lamp system 1 may be placed over the resin injection system 80 via the opening 50. The coupling components 60 may interlock with the resin injection system 80 (e.g., at projections of the support structure 90). The LED light source 30 of the lamp system 1 is thereby to cure the resin within the break. As the liquid resin cures, resin from the resin injection system 80 may be continually provided to reduce the occurrences of voids within the break (as the resin cures, the volume of the resin decreases).

In one embodiment, the system 2 includes an attached spacing structure (not shown) that is adapted to place the lamp system 1 at a correct distance from the glass surface to ensure that the LED light source 30 may suitably focus the light output by the LED light source 30 to the location at which the resin is injected at the glass surface. The spacing structure may maximize the curing effect while the lamp system 1 is not attached to the resin injection system 80 and/or the support structure 90, for instance while curing pit filler after the resin injection system 80 and/or the support structure 90 are detached from the lamp system 1 and removed from the glass surface.

Thus, a lamp system for curing resin in glass that facilitates uniform curing of the resin while a resin injection system is in place has been described.

In the foregoing Specification, various embodiments have been described with reference to specific exemplary embodiments thereof. It will be evident that various modifications can be made thereto without departing from the broader spirit and scope as set forth in the following claims. The Specification and drawings are, accordingly, to be regarded in an illustrative sense rather than a restrictive sense.

What is claimed is:

1. A lamp system for curing resin, comprising:
a light-emitting diode ("LED") light source to emit ultraviolet ("UV") light including a plurality of noncontiguous LED arrays;
an electrical circuit disposed in a circuit board to energize the LED light source; and
a housing adapted to be disposed about a resin injection system, the housing to have mounted therein the circuit board with the electrical circuit and the LED light source such that each noncontiguous LED array of the LED light source is arranged in a portion of the circuit board at an angle relative to a main portion of the circuit board to outwardly emit the UV light from the housing toward a location at which the resin injection system is to inject resin so as to cure the injected resin.

2. The lamp system of claim 1, wherein the housing is adapted to be annularly disposed about the resin injection system and the plurality of noncontiguous LED arrays is to be annularly arranged within the housing.

3. The lamp system of claim 1, wherein the circuit board is to provide the electrical circuit to the LED light source, and the LED light source is to be coupled with the circuit board inside the housing.

4. The lamp system of claim 1, wherein the LED light source is to provide UV light having a wavelength between 300 and 400 nanometers, inclusive.

5. The lamp system of claim 1, wherein the LED light source is to provide between 500 and 10,000 milliwatts of output power per square centimeter, inclusive, toward the location at which the resin injection system is to inject the resin.

6. The lamp system of claim 1, wherein the housing includes a substantially annular opening approximately at the center of the housing that is adapted to accommodate the resin injection system.

7. The lamp system of claim 1, further comprising:
a power cord adapted to supply power to the circuit for energizing the LED light source.

8. The lamp system of claim 7, wherein the power cord is adapted to supply a predetermined voltage to the electrical circuit.

9. The lamp system of claim 8, wherein the power cable is adapted to supply the predetermined voltage between ten (10) volts and thirty-six (36) volts, inclusive, to the electrical circuit from a vehicle battery.

10. The lamp system of claim 7, further comprising:
a current regulator, coupled with the power cord, adapted to supply a predetermined current to the electrical circuit.

11. The lamp system of claim 1, further comprising:
a handle having a suction cup, the handle coupled with the housing and adapted to fixedly support the lamp system when engaged with a glass surface.

12. The lamp system of claim 11, wherein the handle is threadably engaged with the housing so as to be detachable.

13. A system for uniformly curing resin, comprising:
a resin injection system adapted to deliver resin to a glass surface;
a lamp system coupled with the resin injection system, the lamp system having a plurality of noncontiguous light emitting diode ("LED") arrays adapted to emit ultraviolet ("UV") radiation toward the glass surface at which the resin injection system is to inject resin so as to uniformly cure the injected resin, a circuit board adapted to accommodate and energize the plurality of LEDs, and a housing adapted to accommodate the circuit board, wherein the plurality of noncontiguous LED arrays is mounted around the circuit board such that each noncontiguous LED array of the LED light source is arranged in a portion of the circuit board at an angle relative to a main portion of the circuit board.

14. The system of claim 13, further comprising:
a power supply connector, coupled with the circuit board, the power supply connector adapted to supply power to the circuit board for energizing the LEDs.

15. The system of claim 14, wherein the power supply connector comprises:
a cable that is detachably coupled with the circuit board; and
a regulator adapted to supply the circuit board with at least one of a constant voltage and a constant current.

16. The system of claim 13, wherein the plurality of LEDs are adapted to emit the UV radiation at a constant wavelength and a constant power level toward the glass surface at which the resin is to be injected by the resin injection system.

17. The system of claim 13, further comprising:
a support structure adapted to fixedly support the system where the support structure is coupled with the glass surface, the support structure including a plurality of laterally projecting legs wherein a respective leg has a respective suction cup at a respective distal end of the respective leg.

18. The system of claim 17, wherein the support structure is integrated with the resin injection system and coupled with the lamp system.

19. The system of claim 18, wherein the lamp system includes a plurality of notches and further wherein the lamp system is interlockingly connected with the resin injection system using the plurality of notches.

20. An apparatus, comprising:
a light-emitting diode ("LED") light source adapted to emit ultraviolent ("UV") light suitable to cure resin injected into a glass surface, wherein the LED light source includes a plurality of noncontiguous LED arrays;
an LED circuit adapted to power the LED light source, wherein the LED circuit and the LED light source are disposed in a circuit board; and
a light source housing adapted to accommodate the circuit board with the LED light source and further adapted to be annularly disposed about a resin injection system that is to inject the resin into the glass surface, the light source housing having coupling components for coupling with the resin injection system such that the UV light emitted from the LED light source is able to suitably cure the resin injected by the resin injection system where powered by the LED circuit, wherein the plurality of noncontiguous LED arrays is mounted around the circuit board such that each noncontiguous LED array of the LED light source is arranged in a portion of the circuit board at an angle relative to a main portion of the circuit board.

21. The apparatus of claim 20, wherein the coupling components comprise:
a plurality of notches adapted to facilitate connective coupling with the resin injection system.

22. The apparatus of claim 20, further comprising:
a power cord adapted to be detachably coupled with the apparatus.

23. The apparatus of claim 22, further comprising:
a power regulator, coupled with the power cord, adapted to convert electrical power supplied through the power cord at a first level to electrical power at a second level that is suitable for the LED circuit to power the LED light source.

24. The apparatus of claim 20, further comprising:
a handle, coupled with the housing, having a suction cup located at a distal end for coupling with the glass surface.

25. The apparatus of claim 21, wherein the light source housing is to be annularly disposed about the resin injection system where the resin injection system is coupled with the light source housing and further arranged so that emitted UV light is directed toward the glass surface at which the resin is to be injected.

26. The apparatus of claim 20, wherein the plurality of LEDs are adapted to emit the UV light at a predetermined intensity value that is suitable to cure the resin.

* * * * *